(12) United States Patent
Schreiber et al.

(10) Patent No.: US 11,428,379 B2
(45) Date of Patent: Aug. 30, 2022

(54) LOW BEAM HEADLIGHT

(71) Applicant: Fraunhofer-Gesellschaft zur Foerderung der angewandten Forschung e.V., Munich (DE)

(72) Inventors: Peter Schreiber, Jena (DE); Chen Li, Jena (DE); Dirk Michaelis, Jena (DE); Christoph Waechter, Jena (DE); Stephanie Fischer, Jena (DE)

(73) Assignee: Fraunhofer-Gesellschaft zur Foerderung der angewandten Forschuno e.V., Munich (DE)

( * ) Notice: Subject to any disclaimer, the term of this patent is extended or adjusted under 35 U.S.C. 154(b) by 0 days.

(21) Appl. No.: 17/226,429

(22) Filed: Apr. 9, 2021

(65) Prior Publication Data
US 2021/0231280 A1    Jul. 29, 2021

Related U.S. Application Data

(63) Continuation of application No. PCT/EP2019/077238, filed on Oct. 8, 2019.

(30) Foreign Application Priority Data

Oct. 9, 2018 (DE) .......................... 102018217215.3

(51) Int. Cl.
*F21S 41/265* (2018.01)
*F21S 41/143* (2018.01)
(Continued)

(52) U.S. Cl.
CPC ........... *F21S 41/265* (2018.01); *F21S 41/143* (2018.01); *G02B 3/0056* (2013.01); *G02B 19/0061* (2013.01)

(58) Field of Classification Search
CPC ...... F21S 41/265; F21S 41/143; F21S 41/275; F21S 41/43; F21S 41/47; G02B 3/0056; G02B 19/0061
See application file for complete search history.

(56) References Cited

U.S. PATENT DOCUMENTS

2004/0085779 A1 * 5/2004 Pond ..................... F21S 41/321
                                                                  362/516
2009/0262546 A1   10/2009 Stefanov et al.
(Continued)

FOREIGN PATENT DOCUMENTS

AT          514967 B1      8/2015
DE    102009024894 A1     12/2010
(Continued)

OTHER PUBLICATIONS

Li, Chen, et al., "Etendue conserving light shaping using microlens arrays with irregular lenslets", SPIE 10693 (2018) 1069304.

*Primary Examiner* — Evan P Dzierzynski
(74) *Attorney, Agent, or Firm* — Perkins Coie LLP; Michael A. Glenn

(57) ABSTRACT

Low beam headlight that can be obtained with small installation length and high light/energy output are described. A light source arrangement is provided, which generates a light cone of light that is less divergent in a first transverse direction than in a second transverse direction perpendicular to the first transverse direction, and this light source arrangement is used to illuminate three lens arrays arranged next to one another along the second transverse direction, which are thus each irradiated on the input side by an associated one among segments of the light cone arranged next to one another in the second transverse direction and output low beam on the output side with a luminous intensity angle distribution modified with respect to the light cone.

17 Claims, 5 Drawing Sheets

(51) Int. Cl.
*G02B 3/00* (2006.01)
*G02B 19/00* (2006.01)

(56) References Cited

U.S. PATENT DOCUMENTS

| | | | |
|---|---|---|---|
| 2010/0091490 A1* | 4/2010 | Reichel | G02B 3/0031 |
| | | | 362/235 |
| 2011/0228231 A1 | 9/2011 | Schreiber et al. | |
| 2013/0343074 A1* | 12/2013 | Tsukamoto | F21S 41/255 |
| | | | 362/511 |
| 2015/0078029 A1* | 3/2015 | Kumar | F21S 41/143 |
| | | | 362/522 |
| 2015/0252975 A1* | 9/2015 | Nakada | F21S 41/265 |
| | | | 362/521 |
| 2016/0010811 A1* | 1/2016 | Benitez | F21S 41/153 |
| | | | 362/509 |
| 2016/0265733 A1 | 9/2016 | Bauer et al. | |
| 2017/0130923 A1* | 5/2017 | Nishimura | F21V 5/04 |
| 2017/0241606 A1* | 8/2017 | Courcier | F21S 41/285 |
| 2019/0009706 A1 | 1/2019 | Gocke | |

FOREIGN PATENT DOCUMENTS

| | | |
|---|---|---|
| DE | 102016204342 A1 | 9/2017 |
| DE | 102016211653 A1 | 12/2017 |
| DE | 102016213028 A1 | 1/2018 |
| DE | 102017110886 A1 | 11/2018 |
| DE | 102017112971 A1 | 12/2018 |
| JP | 2014041802 A | 3/2014 |
| WO | 2017066817 A1 | 4/2017 |

* cited by examiner

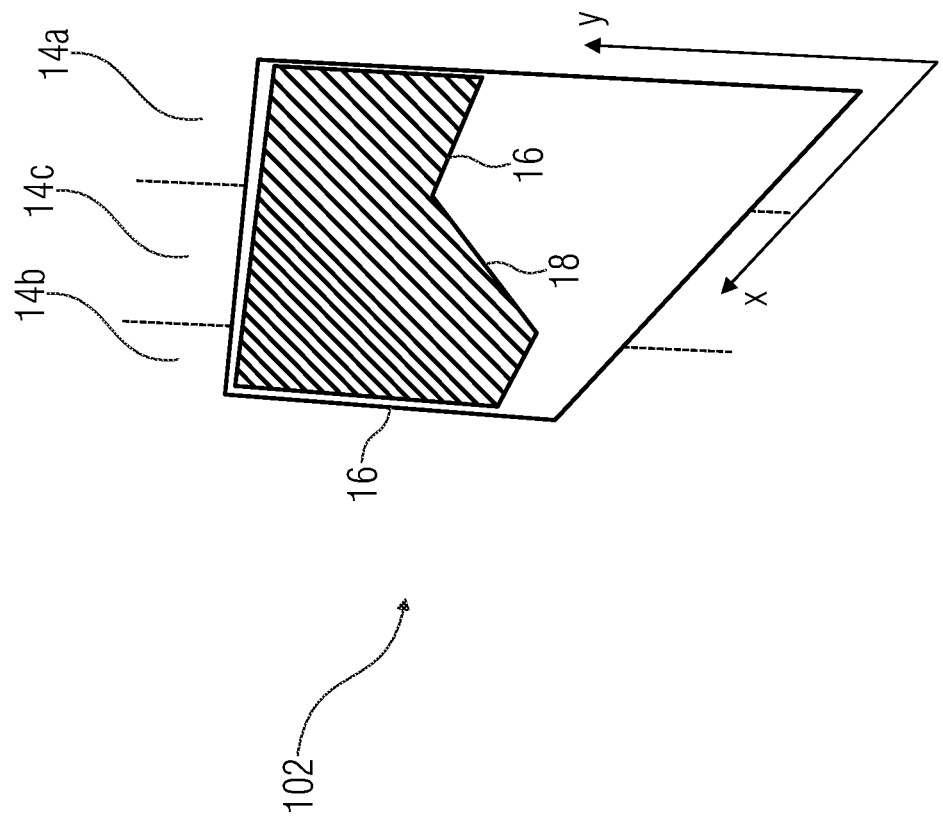
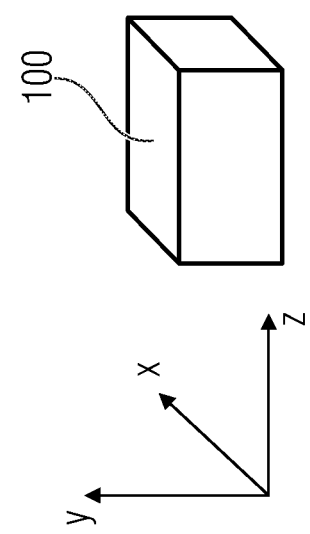
Fig. 5

LOW BEAM HEADLIGHT

CROSS-REFERENCE TO RELATED APPLICATIONS

This application is a continuation of copending International Application No. PCT/EP2019/077238, filed Oct. 8, 2019, which is incorporated herein by reference in its entirety, and additionally claims priority from German Application No. 102018217215.3, filed Oct. 9, 2018, which is also incorporated herein by reference in its entirety.

The present invention relates to a low beam headlight or a low beam for motor vehicles.

BACKGROUND OF THE INVENTION

Essential characteristics of the angular distribution of the luminous intensity of a low beam for motor vehicles are an approximately symmetrical distribution in the horizontal direction with a half width of approx. 8 . . . 10° and an asymmetrical vertical distribution with a half width of approx. 2 . . . 3° with an upwardly sharp light/dark boundary with high contrast to avoid dazzling oncoming vehicles.

The light/dark boundary forms a horizontal line with a vertical height of approx. −0.6° for right-hand traffic in the left-hand direction of travel. To the right of the direction of travel, the boundary is shifted upward to improve illumination of traffic signs, for example. Frequently, a horizontal light/dark boundary is also aimed for on the right. The region where the boundary is shifted is referred to as the elbow and is located in the central area of the radiation in the direction of travel. Generating this complex intensity distribution involves large headlight systems with comparatively low transmission.

In a conventional low beam headlight, an aperture shaped according to the light/dark boundary is illuminated by a beam-shaped light source (usually LED or halogen lamp) and then mapped onto the roadway towards infinity by projection optics. In order to achieve the demanded low divergences, one tries to achieve the smallest possible aperture dimensions, which enables a correspondingly small focal length of the projection optics. However, the reduction of the dimensions is limited by the available luminance of the light sources and the demanded minimum luminous intensity of the headlight.

To achieve small dimensions, light sources with high luminance (e.g. LEDs) are combined with highly efficient beam shaping optics with free-form reflectors and lenses to achieve high transmission. The resulting systems nevertheless have an extension of well over 10 cm in the light propagation direction.

An alternative approach using lens arrays was disclosed in [I]: Multiple individually collimated LEDs serve as the light source, illuminating a condenser microlens array followed by an aperture array and a projection lens array. By moving from conventional single-aperture optics to multi-aperture optics, the focal length of the projection optics, and thus the installation length of the headlight, can be greatly reduced. However, the aperture array reduces the transmission of the system. Furthermore, the apertures are located near an intermediate image plane of the illumination beam path, which causes high energy densities on the absorbing apertures and thus a noticeable heat input into the micro-optical system.

Accordingly, there is a desire for a concept for a low beam that makes it possible to achieve short installation lengths while still achieving effective energy utilization.

SUMMARY

According to an embodiment, a low beam headlight may have: a light source arrangement for generating a light cone of light that is less divergent in a first transverse direction than in a second transverse direction perpendicular to the first transverse direction; first, second and third lens arrays that are arranged next to one another along the second transverse direction in order to be irradiated on the input side by an associated segment of segments of the light cone arranged next to one another in the second transverse direction and to output low beam with a luminous intensity angle distribution modified with respect to the light cone on the output side.

Another embodiment may have a motor vehicle having an inventive low beam headlight.

The present invention is based on the idea that a low beam headlight with a small installation length and a high light/energy efficiency can be obtained by providing a light source arrangement which generates a cone of light that is less divergent in a first transverse direction than in a second transverse direction perpendicular to the first transverse direction, and this light source arrangement is used to illuminate three lens arrays which are arranged next to one another along the second transverse direction and which are thus each irradiated on the input side by an associated one of the segments of the light cone arranged next to one another in the second transverse direction and to output low beam with a luminous intensity angle distribution modified with respect to the light cone on the output side. Optics used within the light source arrangement can thus be configured as single-lens optics, i.e. each lens or optics therein is irradiated by the entire light contributing to the low beam. The same can thus also be provided at low cost and not only with short installation length. In addition, the light source arrangement already performs one of the beam shaping tasks due to the differing divergences in the two transverse directions. According to embodiments of the present application, the divergence in the second transverse direction takes over, for example, the definition of the horizontal aperture angle of the low beam. The different divergence preparation by the light source arrangement is then used in the lens arrays to effectively use the differing divergences in the transverse directions specifically for respective sections of the low beam and to achieve the desired radiation.

According to embodiments, for example, the two outer lens arrays are configured as cylindrical lens arrays so that the same only perform the task of beam shaping in the first transverse direction, while the section of the low beam illuminated by these lens arrays corresponds in each case to a rectilinear extension of the segment of the light cone of the light source arrangement irradiating the same. In particular, the two outer lens arrays can be configured as honeycomb condensers with cylindrical honeycomb lenses on the entry side and on the exit side. The lens arrays thus take advantage of the pre-divergence reduction by the light source array. A mutual offset of an arrangement of the entry-side honeycomb lenses with respect to the exit-side honeycomb lenses in the first transverse direction may be different for the first and third lens arrays with respect to arrangement of lens aperture and/or lens vertex, so that a change in the luminous intensity angle distribution of the segment of the light cone radiating through the first lens array in the first transverse direction by the first lens array is different from a change in the luminous intensity distribution of the segment of the light cone irradiating the third lens array in the first transverse direction through the third lens array. In particular, the two lens arrays can produce light/dark edges in the two portions of the low beam that are outermost in the second transverse direction and that are in different positions along the second transverse direction, i.e., the two horizontal edges, one of which is positioned lower for oncoming traffic than the one on the other side.

The second or central lens array taking care of the central section of the low beam in the second transverse direction may also be formed as a honeycomb condenser with entry-side and exit-side honeycomb lenses. Its inter-honeycomb lens spacing in the second transverse direction may be larger for the exit-side honeycomb lenses than for the entry-side honeycomb lenses. The increase in size may correspond to the higher divergence of the light of the light cone from the light source arrangement along the second transverse direction. This honeycomb condenser may have an aperture array buried immediately behind the entry-side honeycomb lenses as viewed from the light source arrangement to form the elbow in the central section, the mapping of which then defines the elbow just mentioned through the exit-side honeycomb lenses. A configuration without apertures is also possible, according to which the elbow is defined by mapping lens edges, e.g. the lower lens edges, of one or more entry-side honeycomb lenses through the corresponding exit-side honeycomb lenses, namely onto the just-mentioned elbow to define the latter. For this purpose, these mapped edges of the lens apertures of the entry-side honeycomb lenses are configured accordingly deviating from an otherwise rectangular basic shape of the lens apertures of the entry-side honeycomb lenses.

It is thus possible to design low beams as just described with virtually no loss. In particular, lens apertures of the honeycomb lenses of the aforementioned honeycomb condensers can be continuously joined. The lens apertures of exit-side honeycomb lenses of aforementioned honeycomb condensers may have an equidistant pitch in the first transverse direction. Even in the case of using the aperture array in the honeycomb condenser of the second lens array, the light losses are relatively small. In the case of the configuration without apertures, even a configuration of the lens arrays in plastic, such as by injection molding technology, is possible.

BRIEF DESCRIPTION OF THE DRAWINGS

Embodiments of the present invention will be detailed subsequently referring to the appended drawings, in which:

FIG. 5 is a simplified perspective spatial view of the low beam and the light it generates with the light distribution corresponding to a low beam.

DETAILED DESCRIPTION OF THE INVENTION

Figure 1:
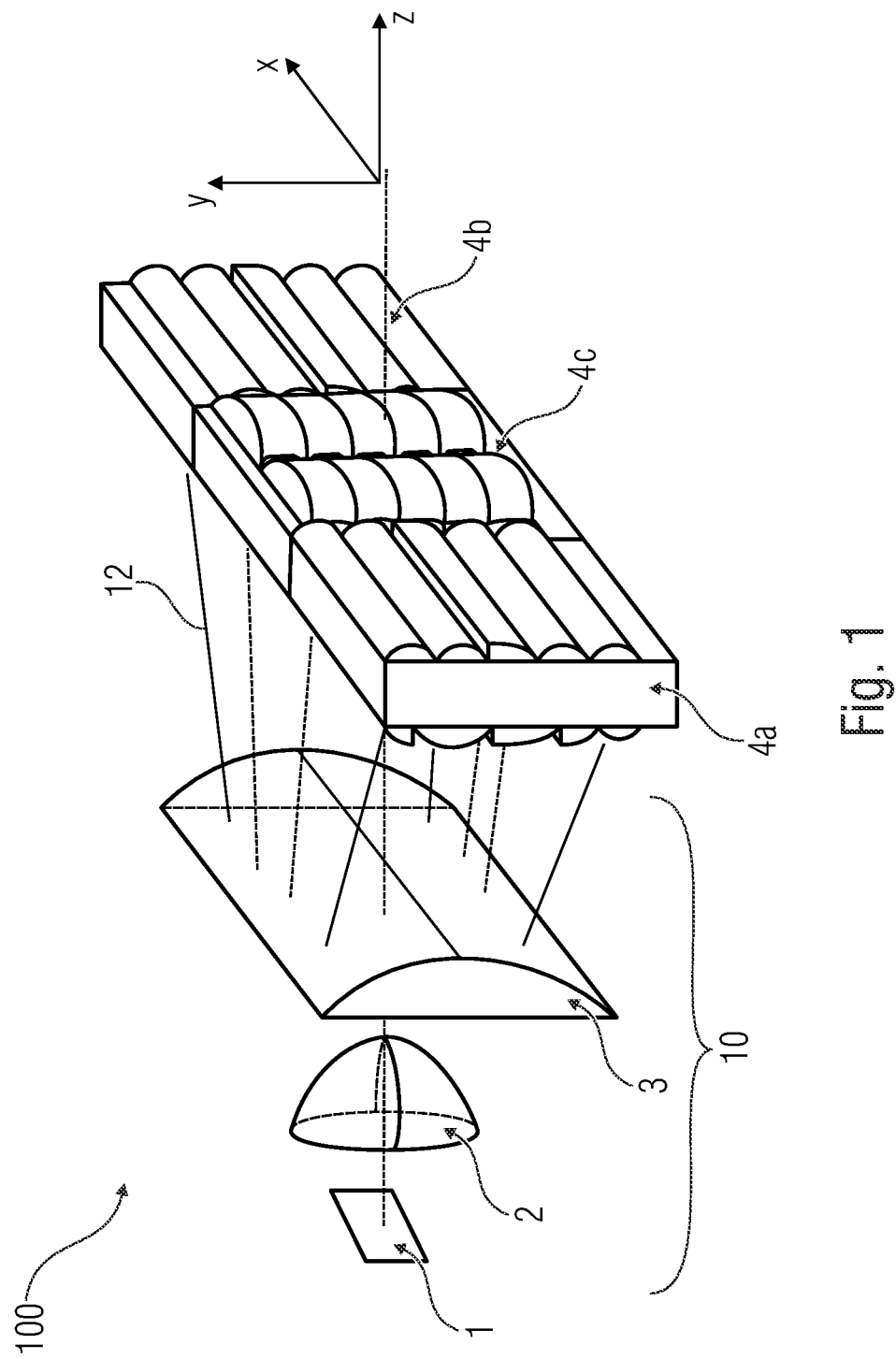
FIG. 1 is a spatial representation of the components of a low beam according to an embodiment of the present application.

The following embodiments follow a novel, etendue-preserving approach for generating continuous luminous intensity distributions by means of irregular honeycomb condensers [2], which largely or even entirely dispenses with apertures in order to make a low beam with short installation length and increased transmission feasible. FIG. 1 shows a first embodiment of a low beam 100 or of a low beam headlight 100 or of an apparatus 100 for generating a low beam 102 (cf. FIG. 5).

The light source is an LED or an LED cluster (1), which—in accordance with the aspect ratio of the demanded output beam—has a greater extension in the horizontal than in the vertical direction. The typically Lambertian radiation of the LED is shaped by a secondary optics. Here, collimation takes place in the vertical direction whereas the divergence in the horizontal direction is only reduced similar to the demanded horizontal distribution of the headlight. These secondary optics consist of a radially symmetrical asphere (2) for divergence reduction and a subsequent cylindrical lens collimator (3). If the LED or LED cluster comprises primary optics (dome) and the same already produces a radiation distribution similar to the demanded horizontal luminous intensity distribution of the headlight, the asphere for divergence reduction (2) can be omitted.

In FIG. 1, the light source 1, the cylindrical collimator 3 and the aspherical lens 2 located therebetween thus form a light source arrangement 10 for generating a light cone 12 from light which is less divergent in a first transverse direction y than in a second transverse direction x which is perpendicular to the first transverse direction y. When the low beam of FIG. 1 is installed in a motor vehicle, the second transverse direction x corresponds to the horizontal, which will be assumed in the following. It should be noted, however, that the configuration of the light source arrangement 10 of FIG. 1 is only exemplary and alternatives also exist. For example, instead of a cylindrical lens collimator 3, an acylindrical collimator or a toroidal collimator could be used. Overall, the light source arrangement can be configured such that the light of the light cone 12 has a divergence that is more than 10 times greater in the horizontal x than in the perpendicular y. The asymmetric divergence is used by the lens arrays illuminated by the light cone 12, as will be described below. For example, the divergence in the horizontal direction may be such that the aperture angle of the light cone 12 is between 20 and 50 degrees.

The subsequent micro-optics for beam shaping consists of three horizontally adjacent segments 4a-c, namely lens arrays, which, as shown in FIG. 5, are associated with the areas 14a and 14b to the right and left of the direction of travel and to the area 14c in the direction of travel, or are provided to illuminate the same.

Figure 2:
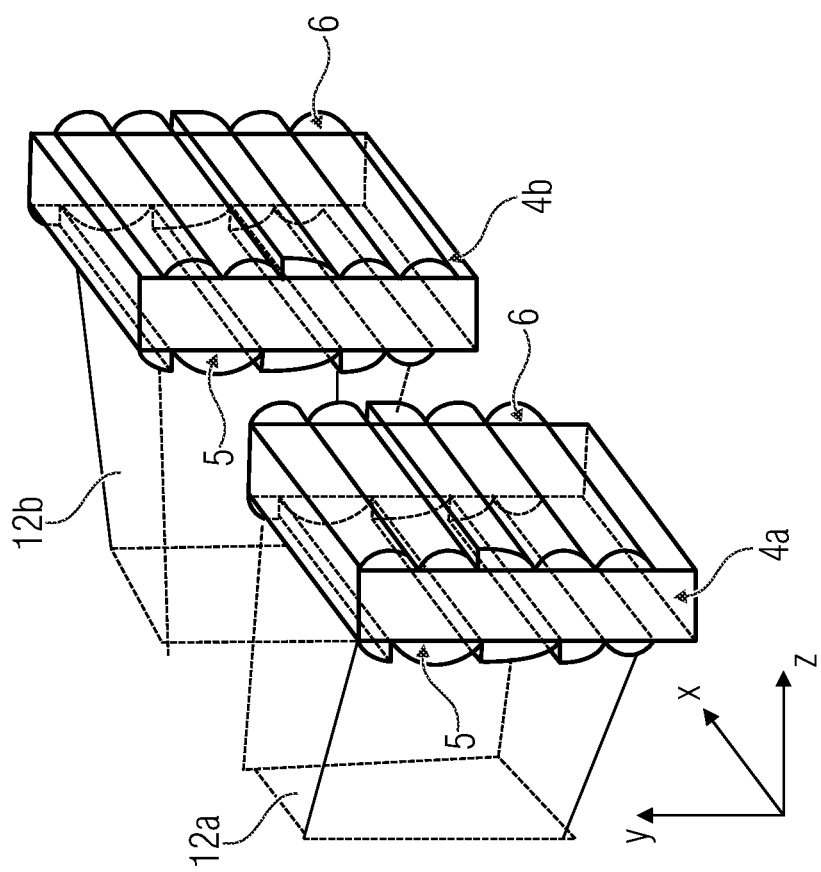
FIG. 2 is a configuration of the two outer lens arrays of the low beam according to an embodiment.

To achieve the needed continuous vertical distribution to the right and left of the direction of travel, irregular honeycomb condensers, advantageously cylindrical lens honeycomb condensers 4a and 4b, each with different vertical heights along the axis y of the projected light/dark boundary 16, are used according to the present embodiment. Irregular input lenslets or honeycomb lenses 5 with different aperture heights or lens apertures of different sizes in y, some of which consist of decentered cylindrical lens segments, are used for this purpose. The output lenslets 6 have a constant aperture height, but can also partly consist of decentered lens segments, as shown in FIG. 2. By controlled decentering of the output array relative to the input array, the height of the light/dark boundary 16 can be set differently for the areas 14a,b to the left and right of the direction of travel. The desired horizontal luminous intensity distribution to the right and left of the direction of travel is achieved by beam shaping of the asphere 2 and the light source arrangement 10, respectively.

In other words, the low beam 100 comprises a first lens array 4a, a second lens array 4c and a third lens array 4b, which are arranged next to one another along the horizontal x so as to be irradiated on the input side by an associated segment of the light cone 12 into which the latter is segmented along the horizontal. On the output side, the lens arrays output the low beam as shown in FIG. 5 with a luminous intensity angle distribution modified with respect to the light cone 12. As shown in FIG. 2, the two outer lens arrays 4a and 4b can be configured as cylindrical lens arrays so that they allow the respective light segment 12a and 12b of the light cone 12 by which they are irradiated to pass undeflected in the horizontal direction x, which conversely means that the section or area 14b and 14a of the low beam irradiated by the lens arrays 4a and 4b along the horizontal axis x corresponds to a rectilinear extension of the respective light cone segment 12a and 12b, namely with the horizontal divergence of the light cone 12. In particular, the lens arrays 4a and 4b can be configured as honeycomb condenser with entry-side and exit-side cylindrical honeycomb lenses 5 and 6. The entry-side and exit-side cylindrical honeycomb lenses, also referred to as lenslets, each form a one-dimensional array in the y direction. The lens apertures of the honeycomb lenses 5 and 6 can be rectangular in shape and continuously joined, as shown in FIG. 2. As far as the mutual offset of the arrangement with entry-side lenslets or honeycomb lenses 5 with respect to the exit-side lenslets 6 along the direction y is concerned, that offset serves to determine the luminous intensity angle distribution in the respectively associated low beam section 14a and 14b, namely in particular the light/dark boundary 16. For that purpose, that mutual offset is designed differently for the two lens arrays 4a and 4b. The exit-side cylindrical lenslets 6 may have lens apertures of the same size in y with respect to each other and may be arranged with a constant repetition distance with respect to each other as shown. Thus, the exit-side cylindrical honeycomb lenslets 6 may form a regular array. However, as shown, several or some of the exit-side cylindrical lenslets 6 may have a lens vertex that is decentered in y. For each lens array 4a and 4b, there exists a pairwise association between input-side lenslets 5 and output-side lenslets 6, such that each input lenslet 5 collimates the incident light of the respective segment 12a and 12b into the associated output lenslet 6 along the direction y. Collimating an input lenslet 5 that is more extended in y into an output lenslet 6 that is smaller in y causes an increase in divergence, and in the reverse case a decrease in divergence in the y direction is achieved. The output lenslets 6 are located in a focal plane of the input lenslets 5. Thus, Köhler illumination is achieved.

Figure 3:
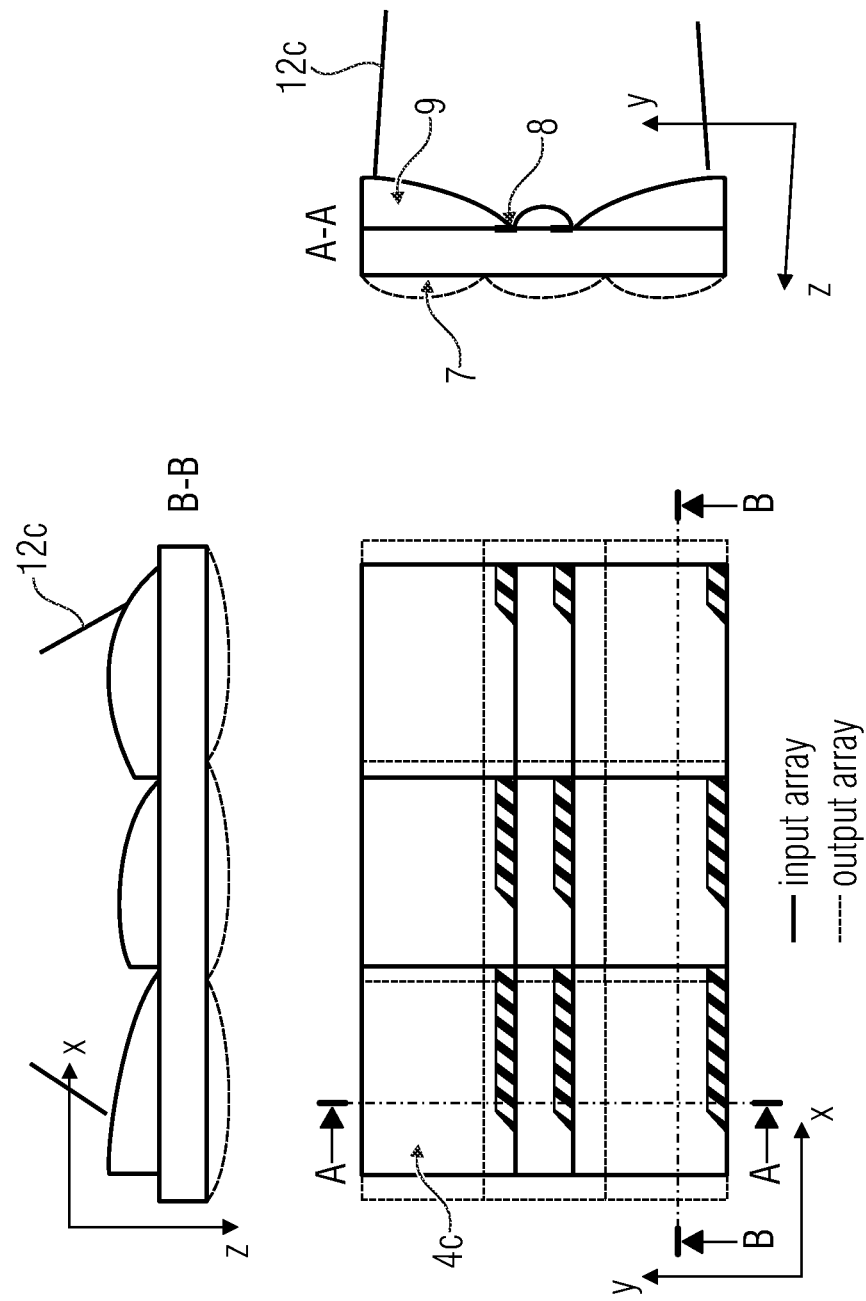
FIG. 3 is a top view showing two side section views of the central lens array according to an embodiment.

The central segment (4c) of the micro-optics consists of a tandem array of irregular rectangular lenslets generating the maximum luminous intensity in the direction of travel and the inclined part of the light/dark boundary or elbow 18, as shown in FIG. 3. Input array and output array each have constant but different lenslet size and distance in the horizontal direction: The horizontal direction of the optical axes of the individual array channels correspond to the horizontal irradiation direction of the light source for the respective array channel. The horizontal distance or pitch of the lenslets 7 of the output array is therefore greater than that of the lenslets 9 of the input array.

In the vertical direction, the input array has different lenslet sizes. The apertures of the input lenslets can be decentered relative to the corresponding output lenslet. To enable Köhler illumination in this case as well, the input lenslets are then configured as decentered lens segments so that the light source is mapped in the center of the associated output lenslet. The output array has rectangular lenslet apertures with constant width and height. However, to achieve the desired far-field distribution, lenslets can also be formed here as decentered lens segments.

The boundary of an aperture structure 8 buried under the input lenslets 9 is mapped onto the road as a light/dark boundary by the output lenslets 7. This mode of operation corresponds to a multichannel projector mapping to infinity. For further details, reference is made to [3].

In other words, the second central lens array 4c can also be configured as a honeycomb condenser with entry-side lenslets 9 and exit-side lenslets 7. In this case, in the horizontal x, the inter-honeycomb lens distance of the exit-side lenslets 7 may be larger than for the entry-side lenslets 9, corresponding to the divergence of the light of the incident light cone 12 in that direction x. The honeycomb condenser forming the central lens array 4c is a two-dimensional honeycomb condenser with a two-dimensional array of honeycomb lenses or lenslets 9 on the entry side and a corresponding two-dimensional array of honeycomb lenses or lenslets 7 on the exit side. Again, there may be a pairwise or 1-to-1 allocation between the lenslets 7 and 9: Each pair of input lenslet 7 and output lenslet 9 forms a channel, with input lenslet 9 collimating incident light onto the respective output lenslet. Thus, Köhler illumination results. The array of output lenslets 7 may be regular in x and y, i.e., the output-side lenslets may have rectangular lens apertures that are continuously joined so as to be arranged in columns of equal width and in rows of equal width. The output side lenslets 7 could have centered lens apertures as shown in FIG. 3, although an alternative exists according to which the same have decentered lens apertures. The exit-side lenslets 7 are located in the focal distance to the entry-side lenslets 9 and vice versa the same applies, i.e. the entry-side lenslets 9 are located in the focal plane of the exit-side lenslets 7. The aperture sections of the aperture array 8 are also located in this plane. Aperture edges are mapped to infinity by the exit-side lenslets 7 to define the elbow 16 there.

Figure 4:
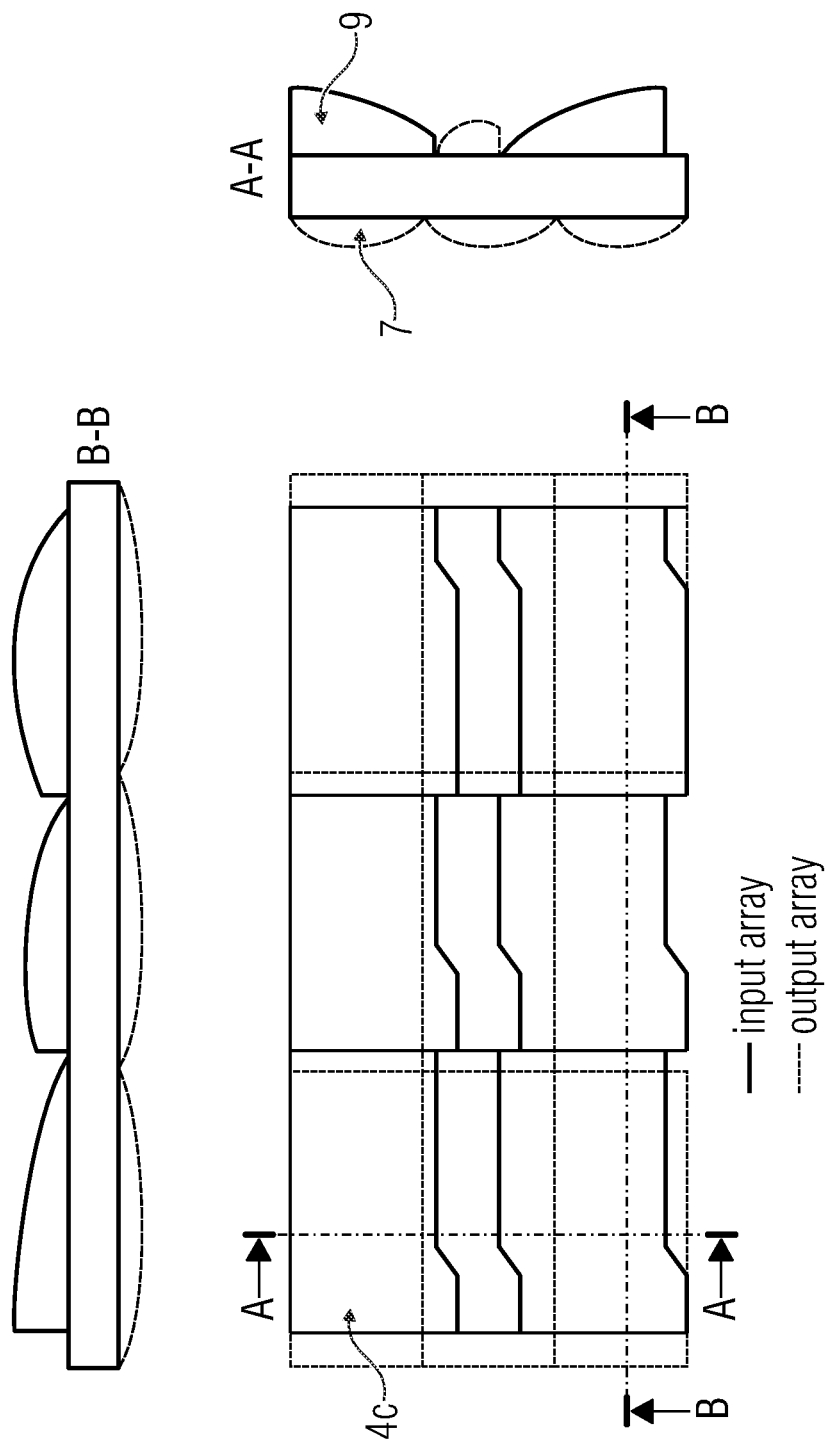
FIG. 4 is a top view and two side sectional views of the central lens array according to a variation in which, in contrast to FIG. 3, a configuration without apertures is present.

An alternative realization of the central segment is also possible without buried apertures with irregular input lenslets (10) whose contour corresponds to the geometry of the elbow—or the aperture structures from FIG. 3. FIG. 4 shows a corresponding realization.

In other words, FIG. 4 shows an alternative according to which it is possible to omit the apertures 8. Here, the elbow 18 is realized by configuring the lens apertures of the entry-side lenslets in a non-rectangular manner. In particular, the bottom edges of the lens apertures of the entry-side lenslets 9 are formed such that they define the elbow 18 when these lower lens edges are mapped to infinity by the corresponding exit-side lenslets 7. The absence of an aperture not only allows the light output to be maximized, but also allows the lens array 4c to be produced of a less heat-resistant material, such as plastic, due to the reduced heat input.

The lighting system described can be integrated into a car headlight individually or consisting of several submodules to achieve the demanded luminous intensity.

The micro-optical realization as a multi-aperture system for beam shaping allows a drastic reduction of the installation length compared to conventional systems. Due to the apertures located only in the central area, which also occupy only a minimal area, the proposed design enables an increased transmission and reduced thermal load of the aperture array compared to [1].

The low beam shown can be used as a motor vehicle low beam or to generate any far-field distribution for a headlight.

The above embodiments thus comprise in particular a low beam with e.g.: reduced installation length in z or along the beam direction consisting of a beam-shaped light source and subsequent beam shaping optics consisting of three irregular microlens arrays arranged horizontally next to each other, which each illuminate an area on the right, on the left and in the direction of travel, respectively. A tandem array configuration is possible. The beam shaping of the light source may comprise collimation in the vertical direction. The beam shaping of the light source may comprise a divergence reduction in the horizontal direction and a collimation in the vertical direction by an asphere and a subsequent cylindrical lens collimator. In particular, beam shaping may be implemented by an asphere and an acylindrical collimator as shown. However, beam shaping through an aspheric and a toroidal collimator would also be possible. The two outer lens arrays can be formed as irregular cylindrical lens arrays. Identical configuration of the lenslets of the two outer lens arrays with different vertical decentration of the output arrays to the input arrays is possible. The two outer lens arrays can also be configured as irregular lens arrays with rectangular lenslets, where the horizontal distance of the lenslets of the output array is greater than the distance of the lenslets of the input array. It is possible to configure the central lens array as an irregular array of rectangular lenslets, where the horizontal distance of the lenslets of the output array can be larger than that of the input array. In this case, an aperture array buried under the input array can generate the central area of the light/dark boundary by mapping the same by means of the output array. By means of suitably contoured input lenslets and mapping these lenslet contours, the central area of the light/dark boundary can also be generated without apertures. The lens arrays can be generated as tandem arrays. A realization of the three tandem arrays as a monolithic element on a common substrate is possible.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] F. Bauer, G. Bohm, "Mikroprojektions-Lichtmodul für einen Kraftfahrzeugscheinwerfer", AT 514967 B1.
[2] C. Li, P. Schreiber, D. Michaelis, Ch. Wächter, St. Fischer, U. D. Zeitner: "Etendue conserving light shaping using microlens arrays with irregular lenslets", SPIE 10693 (2018) 1069304.
[3] P. Schreiber, M. Sieler, E. Förster, "Projektionsdisplay and dessen Verwendung", DE 10 2009 024 894 A1.

The invention claimed is:

1. Low beam headlight comprising:
a light source arrangement for generating a light cone of light that is less divergent in a first transverse direction than in a second transverse direction perpendicular to the first transverse direction; and
first, second and third lens arrays that are arranged next to one another along the second transverse direction in order to be irradiated on the input side by an associated segment of segments of the light cone arranged next to one another in the second transverse direction and to output low beam with a luminous intensity angle distribution modified with respect to the light cone on the output side,
wherein the second lens array is arranged between the first and third lens arrays and is configured as honeycomb condenser with entry-side and exit-side honeycomb lenses, wherein an inter-honeycomb lens distance in the second transverse direction is larger for the exit-side honeycomb lenses than for the entry-side honeycomb lenses.

2. Low beam headlight according to claim 1 for installation in a motor vehicle so that the second transverse direction corresponds to a horizontal.

3. Low beam headlight according to claim 1, wherein the light source arrangement comprises a light source radiating divergently in the first and second transverse directions and a collimator for collimating divergent light from the light source with a degree of collimation increased in the first transverse direction relative to the second transverse direction.

4. Low beam headlight according to claim 3, wherein the light source arrangement comprises an aspherical lens between light source and collimator for pre-collimation.

5. Low beam headlight according to claim 3, wherein the collimator comprises a cylindrical lens collimator or an acylindrical collimator or a toroidal collimator.

6. Low beam headlight according to claim 1, wherein the light source arrangement is configured such that the light of the light cone comprises a divergence which is greater by more than 10 times in the second transverse direction than in the first transverse direction.

7. Low beam headlight comprising:
a light source arrangement for generating a light cone of light that is less divergent in a first transverse direction than in a second transverse direction perpendicular to the first transverse direction; and
first, second and third lens arrays that are arranged next to one another along the second transverse direction in order to be irradiated on the input side by an associated segment of segments of the light cone arranged next to one another in the second transverse direction and to output low beam with a luminous intensity angle distribution modified with respect to the light cone on the output side,
wherein the second lens array is arranged between the first and third lens arrays, and the first and third lens arrays are configured as cylindrical lens arrays, so that for each of the first and third lens arrays, the segment of the light cone irradiating the respective lens array illuminates, on the output side, a section of the low beam that corresponds to a rectilinear extension of the respective segment along the second transverse direction.

8. Low beam headlight comprising:
a light source arrangement for generating a light cone of light that is less divergent in a first transverse direction than in a second transverse direction perpendicular to the first transverse direction; and
first, second and third lens arrays that are arranged next to one another along the second transverse direction in order to be irradiated on the input side by an associated segment of segments of the light cone arranged next to one another in the second transverse direction and to output low beam with a luminous intensity angle distribution modified with respect to the light cone on the output side,
wherein the second lens array is arranged between the first and third lens arrays, and each of the first and third lens arrays is configured as a honeycomb condenser comprising entry-side and exit-side cylindrical honeycomb lenses.

9. Low beam headlight comprising:
a light source arrangement for generating a light cone of light that is less divergent in a first transverse direction than in a second transverse direction perpendicular to the first transverse direction; and
first, second and third lens arrays that are arranged next to one another along the second transverse direction in order to be irradiated on the input side by an associated segment of segments of the light cone arranged next to one another in the second transverse direction and to output low beam with a luminous intensity angle distribution modified with respect to the light cone on the output side,
wherein the second lens array is arranged between the first and third lens arrays, and each of the first and third lens arrays is configured as a honeycomb condenser comprising a first one-dimensional array of input-side cylindrical honeycomb lenses extending along the first transverse direction and a second one-dimensional array of exit-side cylindrical honeycomb lenses extending along the first transverse direction.

10. Low beam headlight according to claim 9, wherein a mutual offset of an arrangement of the entry-side cylindrical honeycomb lenses with respect to the exit-side cylindrical honeycomb lenses in the first transverse direction is different for the first and third lens arrays with respect to lens aperture and/or lens vertex, so that a change of luminous intensity angle distribution of the segment of the light cone irradiating the first lens array in the first transverse direction is different from a change of luminous intensity angle distribution of the segment of the light cone irradiating the third lens array in the first transverse direction.

11. Low beam headlight according to claim 10, wherein for the first and third lens arrays the exit-side cylindrical honeycomb lenses comprise lens apertures of equal size with respect to each other in the first transverse direction and are arranged with a constant repetition distance to each other.

12. Low beam headlight according to claim 1, wherein the honeycomb condenser of the second lens array comprises an aperture array buried behind the entry-side honeycomb lenses as viewed from the light source arrangement, the mapping of which by the exit-side honeycomb lenses creates a light/dark edge in a central portion of the low beam.

13. Low beam headlight according to claim 1, wherein the honeycomb condenser of the second lens array is configured without apertures.

14. Low beam headlight according to claim 1, wherein the honeycomb condenser of the second lens array is configured without apertures and such that mapping of lens edges of the entry-side honeycomb lenses by the exit-side honeycomb lenses generate a light/dark edge in a central portion of the low beam.

15. Low beam headlight according to claim 1, wherein
the luminous intensity angle distribution of the low beam in a first portion illuminated by the segment of the light cone irradiating the first lens array comprises, in the first transverse direction through the first lens array, a first light/dark edge extending in the second transverse direction,
the luminous intensity angle distribution of the low beam in a second portion illuminated by the segment of the light cone irradiating the third lens array comprises, in the first transverse direction through the third lens array, a third light/dark edge extending in the second transverse direction with a different position in the first transverse direction than the first light/dark edge,
the luminous intensity angle distribution of the low beam in a third section illuminated by the segment of the light cone irradiating the second lens array comprises, in the first transverse direction through the second lens array, a second light/dark edge extending obliquely with respect to the first and second transverse directions and running from the first to the third light/dark edge.

16. Low beam headlight according to claim 1, wherein the first, second and third lens arrays are monolithically formed on a common substrate.

17. Motor vehicle comprising a low beam headlight according to claim 1.

* * * * *